UNITED STATES PATENT OFFICE.

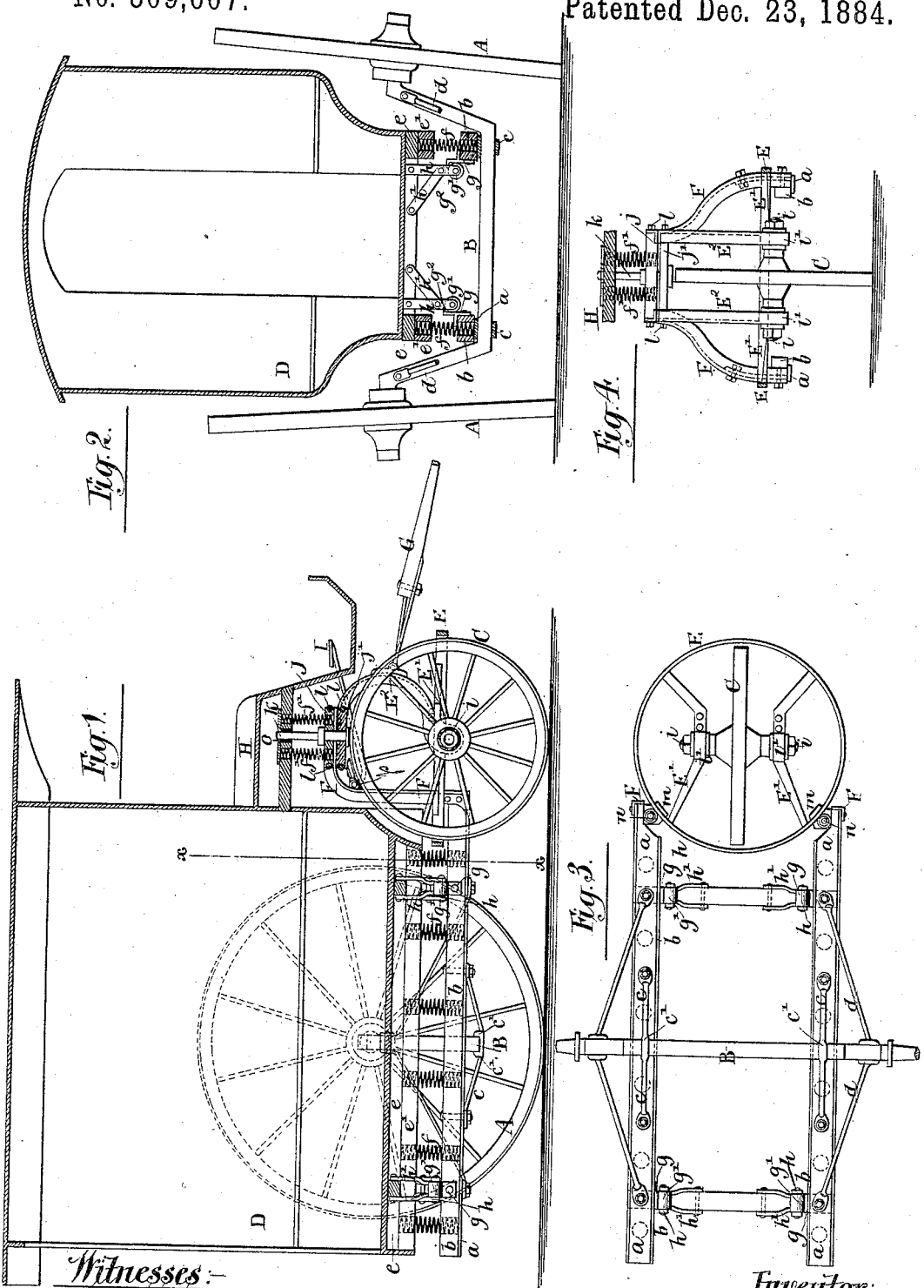

ROBERT W. DAVIS, OF ELMIRA, NEW YORK.

VEHICLE RUNNING-GEAR.

SPECIFICATION forming part of Letters Patent No. 309,607, dated December 23, 1884.

Application filed May 8, 1884. (No model.)

*To all whom it may concern:*

Be it known that I, ROBERT W. DAVIS, of Elmira, in the county of Chemung and State of New York, have invented certain new and useful Improvements in Wheeled Vehicles, of which the following is a specification.

Certain features of my invention are applicable to wheeled vehicles generally, but other features relate particularly to an improved construction of tricycle-coach, hereinafter fully described.

The invention consists in the combination, with the frame or bed and the body of a vehicle, of spiral springs arranged in a novel manner, hereinafter particularly described, between the bed or frame and the body, and supporting the latter, whereby I distribute the weight upon a large number of springs and produce a very easy-riding vehicle.

The invention also consists in a novel construction of the frame or bed of the vehicle, whereby the spiral springs are held in proper position and supported.

The invention also consists in the combination, with a drop-axle, of base or sole plates extending longitudinally of the vehicle, and a novel construction of braces for staying said plates from said axle.

The invention also consists in the combination, in a tricycle coach or vehicle, of a frame of novel construction, hereinafter particularly described, containing and adapted to turn with the front wheel, and in a novel arrangement of devices for guiding said frame.

The invention also consists in various other details of construction, to be hereinafter described.

In the accompanying drawings, Figure 1 represents a longitudinal section of a tricycle-coach embodying my invention. Fig. 2 represents a vertical transverse section upon the dotted line $x\ x$, Fig. 1. Fig. 3 represents a plan of the under side of the axle and its superposed frame or bed and the front wheel and the frame which contains it; and Fig. 4 represents a front view of the front wheel, the frame in which it is supported, and the pintle-bearing.

Similar letters of reference designate corresponding parts in all the figures.

A A designate the main pair of wheels, which are fitted upon a drop-axle, B, as clearly seen in Fig. 2; and C designates the single front wheel.

D designates the body of the coach, which may be of any desired shape or construction.

Supported upon the axle B, at a proper distance apart, are two sole or base plates, $a$, about equal in length to the body D, and upon the sole or base plates are timbers or wood bars $b$. (Shown very clearly in Fig. 2.)

In order to properly retain the sole-plates or base-plates $a$ in position on the axle, I employ braces $c$, which are bolted at their two ends to the said sole-plates and pass under the axle B, as seen in Fig. 1. The braces $c$ are provided with lugs $c'$, between which the axle fits, and thereby additional security is obtained. In addition to the braces $c$, I employ braces $d$, which extend from each side of the axle B, on the outside of the sole-plates $a$, to near the ends of said sole-plates, where they are bolted to the under side thereof. The sole-plates $a$, their superposed wood pieces $b$, and the braces $c\ d$, or others suitably arranged, form a frame or bed, on which the body D is supported.

To the under sides of the sills $e$ of the body D are secured wood pieces or bars $e'$, which are immediately over the sole-plates $a$, and wood bars or pieces $b$, and between the pieces $b$ and $e'$ are arranged spiral springs $f$ in two rows extending along opposite sides of the body and along the whole length thereof. The pieces or bars $b\ e'$ are both bored entirely through in places to form sockets for the reception of the ends of the springs $f$, and the two ends of the springs bear against or upon the sole-plates $a$ and the sills $e$. The boring through of the pieces $b$ and $e'$ provides for forming the sockets of the springs $f$ in a very simple and inexpensive manner. When the body is supported on a great number of springs, of course the weight is widely distributed, each spring having only to support a small proportion of the weight, and hence a very easy and comfortable vehicle is produced.

The springs $f$ may be made of steel or other metal; but I prefer to make them of brass, as the latter metal is most durable.

In order to guide the body in its rising and falling movements incident to the compression and expansion of the springs $f$, and also to prevent side motion of the body D, I secure to the inner sides of the pieces $b$ near each end a pair of guides, $g$, and $g'$ designates rollers which are preferably made of rubber, and are journaled in hangers $h$, descending from the body D, as clearly shown in Fig. 2. The hangers $h$ are made rigid by means of braces $h'$, and as the body D rises and falls the rollers $g'$ run up and down on the guides $g$ with no noise and little friction.

At the upper ends of the guides $g$ are inward projections, $g^2$, which form stops for limiting the upward movement of the rollers $g'$, and consequently of the body D.

I will now describe the construction of the forward parts of the vehicle. The front wheel, C, which tracks between the main wheels A, is considerably smaller in diameter than the latter. The front wheel, C, is supported in a frame which is composed of a ring, E, arranged in a horizontal plane just above the axles or journals $i$ of the front wheel, cross-bars E', which comprise bearings $i'$ for the journals or axles $i$, and standards or uprights $E^2$, which are bolted rigidly to the upper sides of the cross-bars E' forward of the bearings $i'$, and project upward therefrom. The standards or uprights $E^2$ are curved outward or forward, as clearly seen in Fig. 1, for a purpose hereinafter named.

To the forward ends of the sole-plates $a$, before described, are rigidly bolted or riveted hangers F, which project upward and above the standards or uprights $E^2$, and thence horizontally forward, the said hangers being curved inward, as seen clearly in Fig. 4, so as to bring their upper ends at about the same distance apart as the standards or uprights $E^2$.

Immediately over the front wheel, C, is a pintle-bearing, $j\ j'$, designating the lower and upper plates thereof, and $k$ the king-bolt by which said plates are pivoted together. The two hangers F and the uprights or standards $E^2$ are both, as here represented, made of angle-iron, and the plates $j\ j'$ may consist simply of square pieces of hard-wood plank, the under plate, $j'$, being fitted and secured between the standards or uprights $E^2$ by means of bolts $l$, and the upper plate, $j$, being fitted and secured between the hangers F by similar bolts, $l$.

It will be observed that the ring E, cross-bars E', and uprights or standards $E^2$, being bolted rigidly together, form a strong and rigid frame, which turns with the wheel C in either direction, and the pole or shafts G, being attached to the forwardly-curved uprights or standards $E^2$, bring the draft considerably forward of the center of the front wheel.

In order to guide the ring E, and prevent any tilting of the front frame and transverse strain on the king-bolt $k$, I form a bearing for the said ring on each of the hangers F, as best seen in Fig. 3. These bearings are formed by projections or lugs $m$ on the hangers and rollers $n$, preferably made of or covered with india-rubber, and by said bearings the ring is held against side movement, and the center of the front wheel is maintained exactly below the king-bolt $k$, while the ring is free to turn without noise or any considerable amount of friction.

It will be observed that the point at which the shafts or pole is connected with the uprights or standards $E^2$ is about half-way in vertical height between the bearings formed by the lugs $m$ and rollers $n$ and the pintle-bearing, and hence the draft comes upon both bearings about equally.

H designates the driver's seat, which is rigidly attached to the body D, and the pintle $k$ projects through the under side of the seat, and thereby holds the body against longitudinal movement independently of its supporting frame or bed. The king-bolt is surrounded in the seat with a rubber or other soft washer or thimble, $o$, which prevents the king-bolt from striking against the sides of the hole through which it projects and thereby creating noise. The seat H of course moves up and down with the body D, and it is supported by a group of springs, $f'$, (here shown as four in number,) arranged around the king-bolt between the bottom of the seat and the upper pintle-plate, $j'$, as seen in Figs. 1 and 4.

I designates a brake-lever, which is adapted to be reached by the foot of the driver, and is pivoted at $p$.

By my invention I provide a coach which is light, durable, and of simple construction, and which forms a very easy-riding vehicle.

What I claim as my invention, and desire to secure by Letters Patent, is—

1. The combination, with the bed or frame and the body of a vehicle, of spiral springs arranged under opposite sides of the body at intervals along the entire length thereof, and supporting it upon said bed or frame, substantially as specified.

2. The combination of the axle B, the body D, the sole-plates $a$, the longitudinal bars or pieces $b\ e'$, having sockets opposite each other, arranged at intervals along the length of the body, and the spiral springs $f$, substantially as specified.

3. The combination of the drop-axle B, the longitudinal sole-plates $a$, and the braces $c$ and $d$, substantially as specified.

4. The combination, with the bed or frame and the body of a vehicle, and springs arranged between the two, of guides upon said bed or frame, and rollers depending from the body in contact with said guides, and adapted to roll thereon during the rising and falling movements of the body, substantially as specified.

5. The combination of the axle B, the sole-plates $a$, and pieces or bars $b$, the guides $g$, having stops $g^2$, the body D, the spiral springs $f$, and the rollers $g$, substantially as specified.

6. In a tricycle-vehicle, the combination, with the main axle and a bed or frame supported thereon, of hangers extending upward from said bed or frame, and a frame supported by and extending above the front wheel and comprising a horizontal ring, a pintle-bearing between said hangers and the last-mentioned frame, and bearings on the bed or frame on its hangers wherein said ring fits and may turn, whereby both the upper and lower parts of the frame supported by the front wheel are connected with said bed or frame, substantially as specified.

7. In a tricycle-vehicle, the combination of the front wheel, C, the frame supported by said wheel and comprising the ring E, the cross-bars E', and the forwardly-curved standards or uprights E², the bed or frame for supporting the body, the hangers F, and the pintle-plates $j\ j'$, and pin $k$, all substantially as specified.

ROBERT W. DAVIS.

Witnesses:
N. V. DAVIS,
ROBERT J. KNOX.